United States Patent
Namekawa

(10) Patent No.: US 6,523,099 B1
(45) Date of Patent: Feb. 18, 2003

(54) INTEGRATED CIRCUIT WITH OUTPUT INHIBIT FEATURE AND A CONTROL PORT TO RECEIVE AN INHIBIT RELEASE PASSWORD

(75) Inventor: Nobuo Namekawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/270,779

(22) Filed: Mar. 17, 1999

(30) Foreign Application Priority Data

Mar. 19, 1998 (JP) .................................... 10-070837

(51) Int. Cl.[7] ............................................. G06F 12/00
(52) U.S. Cl. ...................... 711/163; 711/147; 711/154; 713/202; 710/200
(58) Field of Search ........................... 711/163, 147, 711/149, 152, 154, 164; 713/202; 710/200

(56) References Cited

U.S. PATENT DOCUMENTS

| | | | |
|---|---|---|---|
| 4,821,177 A | * 4/1989 | Koegel et al. ............... | 364/200 |
| 5,251,304 A | 10/1993 | Sibigtroth et al. ........... | 711/163 |
| 5,465,341 A | 11/1995 | Doi et al. .................... | 711/163 |
| 5,737,760 A | 4/1998 | Grimmer, Jr. et al. ....... | 711/163 |
| 5,784,577 A | * 7/1998 | Jacobsen et al. ............ | 395/284 |

* cited by examiner

Primary Examiner—Matthew Kim
Assistant Examiner—C. P. Chace
(74) Attorney, Agent, or Firm—Jay H. Maioli

(57) ABSTRACT

In an integrated circuit in which data can be read out from a memory (107) by supplying control data through an access port (101), this integrated circuit includes an access detecting circuit (111) for detecting an access using the access port (101) and an output inhibit circuit (120) for inhibiting the output of data from the memory (107) when this access detecting circuit 111 detects the access. Therefore, in the integrated circuit in which data can be read out from the memory (107) outside of the integrated circuit by a standardized protocol, the reading of data that should be made unintelligible can be limited.

3 Claims, 5 Drawing Sheets

INTEGRATED CIRCUIT WITH OUTPUT INHIBIT FEATURE AND A CONTROL PORT TO RECEIVE AN INHIBIT RELEASE PASSWORD

BACKGROUND OF THE INVENTION

1. Field of the Invention

The present invention relates to an integrated circuit housing a memory therein, and particularly to an integrated circuit including an access port made according to predetermined standards.

2. Description of the Related Art

Heretofore, there have been developed and manufactured a variety of integrated circuits housing microprocessors (e.g. CPU (central processing unit), DSP (digital signal processor), etc.) or memories in addition to a logic section. Debugging is indispensable for such integrated circuits in order to inspect an error in software and to correct such error, if any, when software executed by a microprocessor is, developed In order to effect such debugging, it is customary that software stored in the memory incorporated within the integrated circuit is read out and checked.

In order to execute such debugging, there is standardized a protocol by which software can be comparatively easily read out from the memory housed within the integrated circuit. There has been developed an integrated circuit including an access port made according to JTAG (joint test action group) standards standardized in IEEE1149.1 standards and in which information within the integrated circuit can be exchanged between it and the outside by using a protocol (hereinafter referred to as JTAG protocol) standardized by the JTAG standards.

FIG. 1 is a schematic block diagram showing an example of such integrated circuit. As shown in FIG. 1, an integrated circuit 10 includes a microprocessor 11. As circuits for processing data under control of this microprocessor 11, the integrated circuit 10 includes a ROM (read-only memory) 12 for storing program data as software, a RAM (random-access memory) 13 for temporarily storing data upon processing and a logic unit 14 for executing processing. A bus line 15 is connected to the ROM 12, the RAM 13, the logic unit 14 and the microprocessor 11. The integrated circuit 10 includes a data input and output (I/O) port 16 from which data processed by the integrated circuit 10 is outputted or through which data is inputted to the integrated circuit 10. An external memory (e.g. external ROM, external RAM, etc.) 20 connected to this data I/O port 16 becomes able to transfer data among it and respective units within the integrated circuit 10 through the bus line 15.

When the integrated circuit is of an integrated circuit conforming to the above-mentioned JTAG standards, this type of integrated circuit includes an access port 17 standardized by the JTAG standards independently of the data I/O port 16. A device connected to the access port 17 in order to effect debugging and the microprocessor 11 become able to transfer data through a JTAG interface (I/F) circuit 18. The access port 17 standardized by the JTAG standards includes, at minimum, four ports (test clock signal port: TCK, test mode select signal port; TMS, test reset signal port: TRST, test data input signal port: TDI) and one output port (test data output signal port: TDO). Information is transmitted and received between the JTAG I/F circuit 18 and the microprocessor 11 via a JTAG protocol control signal. Although not shown, the microprocessor 11 incorporates therein a section capable of interpreting the JTAG protocol control signal.

In the case of the integrated circuit thus arranged, by supplying the JTAG protocol control signal, which is used to read data from the ROM 12, to the access port 17 from the outside, all data can be read out from the ROM 12 to devices connected to the I/O port 16, thereby making it easy to debug software built in the integrated circuit.

However, if data had been read out from the memory housed within the integrated circuit by the protocol control signal such as the JTAG protocol control signal, scrambled data such as unintelligible data would be easily outputted to the outside. It is not preferable that a program, used to encrypt communication data, should easily read out from an integrated circuit for communication processing, for example. In particular, in the case of the standardized protocol such as JTAG protocol, since its control program also is made open to the public, and a debugging tool of built-in software also is made open to the public, those who do not have sophisticated knowledge of software are able to read, out data from the memory provided within the integrated circuit. This is not preferable from a secrecy standpoint.

SUMMARY OF THE INVENTION

In view of the aforesaid aspect, it is an object of the present invention to provide an integrated circuit in which data can be read out to the outside by a predetermined protocol and in which reading of data that should be made unintelligible can be limited.

According to an aspect of the present invention, there is provided an integrated circuit in which data can be read out from a memory. This integrated circuit comprises an access detecting circuit for detecting whether or not an access using an access port is made and an output inhibit circuit for inhibiting the output of data stored in a memory. Even when control data instructing the reading of data from the memory by using the access port is supplied from the outside, with respect to predetermined data on which an inhibit processing is effected by the output inhibit circuit, its output processing is inhibited and the data is not outputted to the outside.

DESCRIPTION OF THE PREFERRED EMBODIMENTS

Figure 1:
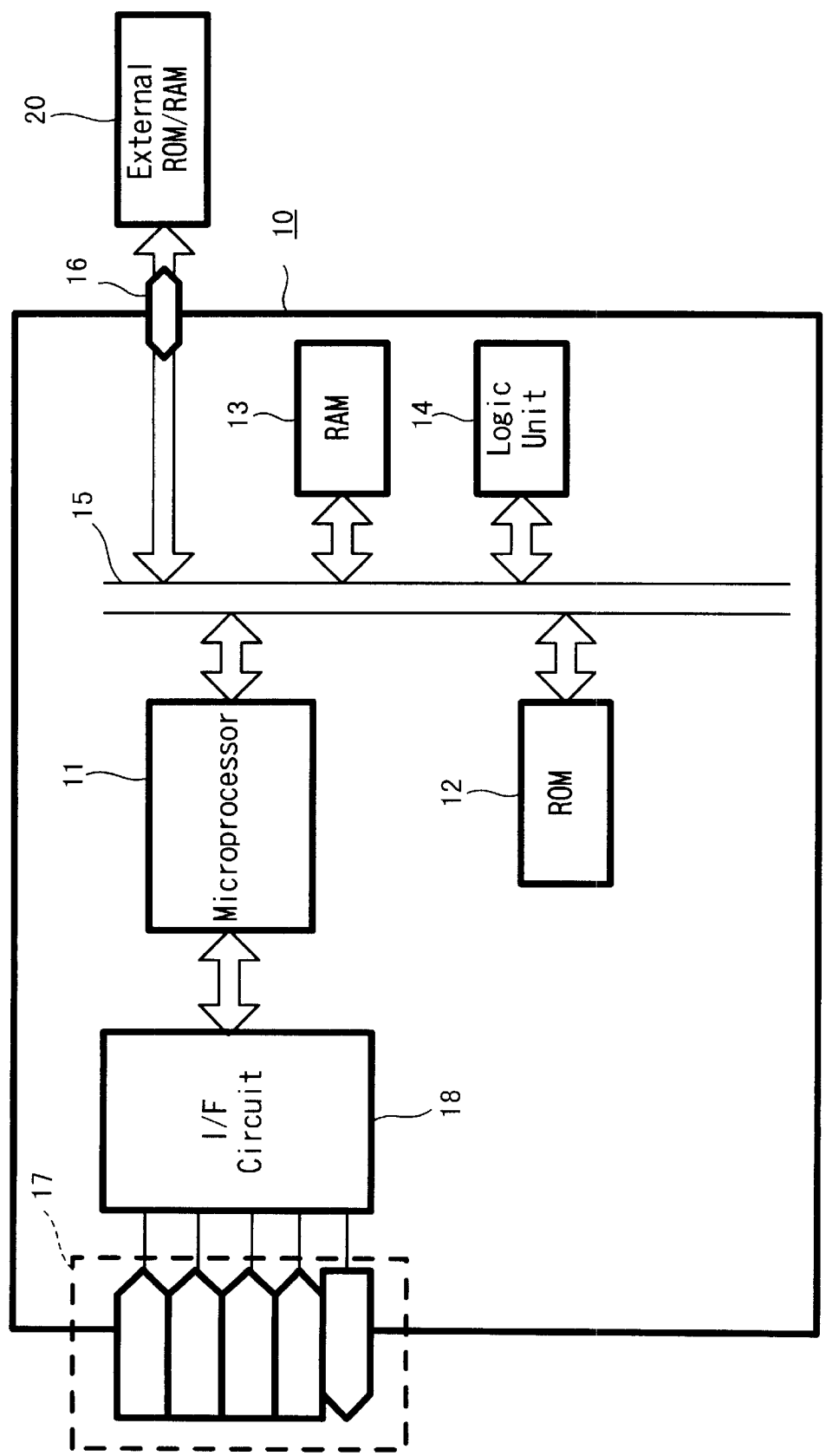
FIG. 1 is a schematic block diagram showing an example of a conventional integrated circuit.
Figure 2:
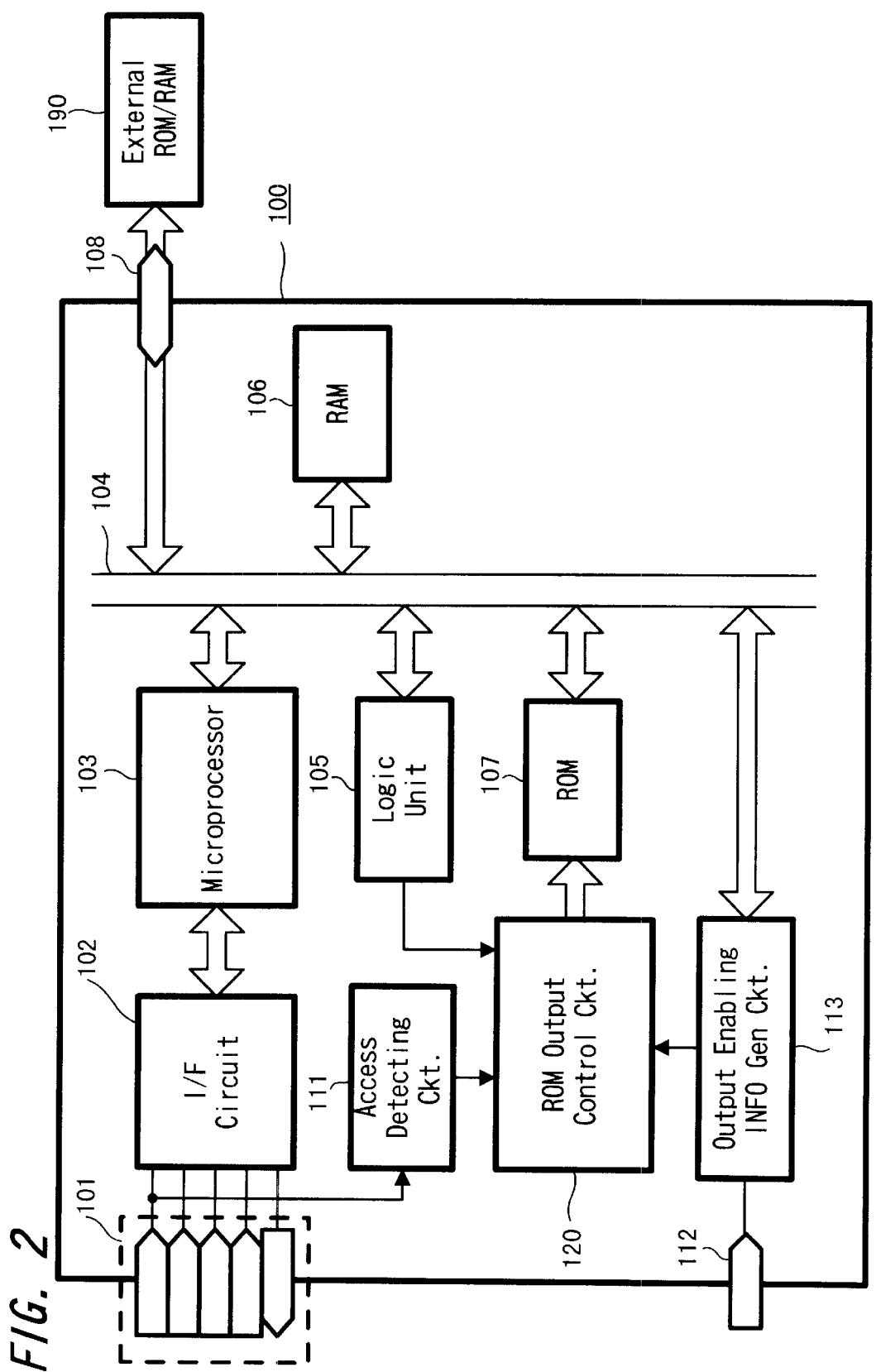
FIG. 2 is a block diagram showing an integrated circuit according to an embodiment of the present invention.

An integrated circuit according to an embodiment of the present invention will hereinafter be described with reference to FIGS. 2 to 4.

In this embodiment, the present invention is applied to an integrated circuit in which data can be transferred between external equipment and the inside thereof by a standardized protocol (e.g. JTAG protocol). FIG. 2 is a block diagram showing an overall arrangement of an integrated circuit according to the embodiment of the present invention The present invention will be described below with reference to FIG. 2. As shown in FIG. 2, an integrated circuit, which is generally depicted by reference numeral 100 in this embodiment, includes an access port 101 for enabling communication based on JTAG. Accordingly, a control signal is transferred between external equipment connected to the access port 101 and a microprocessor 103 through an interface (I/F) circuit 102 connected to this access port 101.

The access port 101 includes at least four input ports (test clock signal port: TCK, test mode select signal port: TMS, test reset signal port: TRST, test data input signal port: TDI) and one output port. (test data output signal port: TDO). Information is transmitted and received between the JTAG interface circuit 102 and the microprocessor 103. In the microprocessor 103, there is arranged a section for interpreting a JTAG protocol control signal.

The integrated circuit 100 includes a ROM 107 for storing program data such as software, a RAM 106 for temporarily storing data upon processing and a logic unit 105 for executing processing, all of which are operated under control of the microprocessor 103. The ROM 107, the RAM 106, the logic unit 105 and the microprocessor 103 are connected to one another through a bus line 104. The ROM 107 at its address has stored in advance program data as software necessary for operating this integrated circuit 100.

The integrated circuit 100 further includes a data input/output (I/O) port 108 for outputting data processed by the integrated circuit 100 and which inputs data into the integrated circuit 100. An external memory (e.g. external ROM, external RAM etc.) 190 connected to the data I/O port 108 becomes able to transfer data between it and respective units provided within the integrated circuit 100 through the bus line 104. Other circuits than the external memory 190 may be connected to the I/O port 108.

In this embodiment, the integrated circuit 100 includes a ROM output control circuit 120 for controlling the manner in which data is read out from the ROM 107 within the integrated circuit 100. Output control information for reading out stored data is supplied through this ROM output control circuit 120 to the ROM 107. Output control information from the logic unit 105 is supplied to the ROM output control circuit 120 and output inhibit information from an access detecting circuit 111 is supplied to the ROM output control circuit 120. Output enabling information also is supplied from an output enabling information generating circuit 113 to the ROM output control circuit 120.

The access detecting circuit 111 is adapted to detect whether or not access is made by using the access port 101. That is, the access detecting circuit 111 detects access based on the state of an input port (e.g. test clock signal port: TCK) provided within the access port 101. The input port whose state is detected by the access detecting circuit 101, is an input port whose level is constantly changed when accessed by the JTAG protocol control signal.

The access detecting circuit 111 detects access by using an edge detecting circuit (not shown), for example, to detect a leading edge in which signal logic level changes from low level "0" to high level "1" or a trailing edge in which signal logic level changes from high level "1" to low level "0". When the edge detecting circuit detects either the above-mentioned leading edge or trailing edge, the access detecting circuit 111 detects access. When this access detecting circuit detects access, output inhibit information is supplied to the ROM output control circuit 120. The ROM output control circuit 120 inhibits data from being read out from a predetermined address of the ROM 107 in response to the output inhibit information supplied thereto.

The output enabling information generating circuit 113 is adapted to generate output enabling information for enabling output to the read control port 112 provided in the integrated circuit 100 based on data obtained from the outside or data obtained through the bus line 104 to the output enabling information generating circuit 113. The output enabling information generating circuit 113 generates output enabling information for enabling the ROM 107 to output data when it is detected that data (simple signal or complex data such as a password) is supplied to the read control circuit 112 from the outside. Alternatively, when data is supplied to the read control circuit 112 from the microprocessor 103 or the like within the integrated circuit 100, the output enabling information generating circuit 113 may generate the output enabling information for enabling the ROM 107 to output data. When the output enabling information from this output enabling information generating circuit 113 is supplied to the ROM output control circuit 120, the ROM output control circuit 120 reads out data from an address of the ROM 107. At that time, output enabling information is used with a priority to output inhibit information (i.e. Output is enabled when output enabling information and output inhibit information are supplied simultaneously).

The manner in which data is read out from the ROM 107 will be described with reference to FIG. 3.

Figure 3:
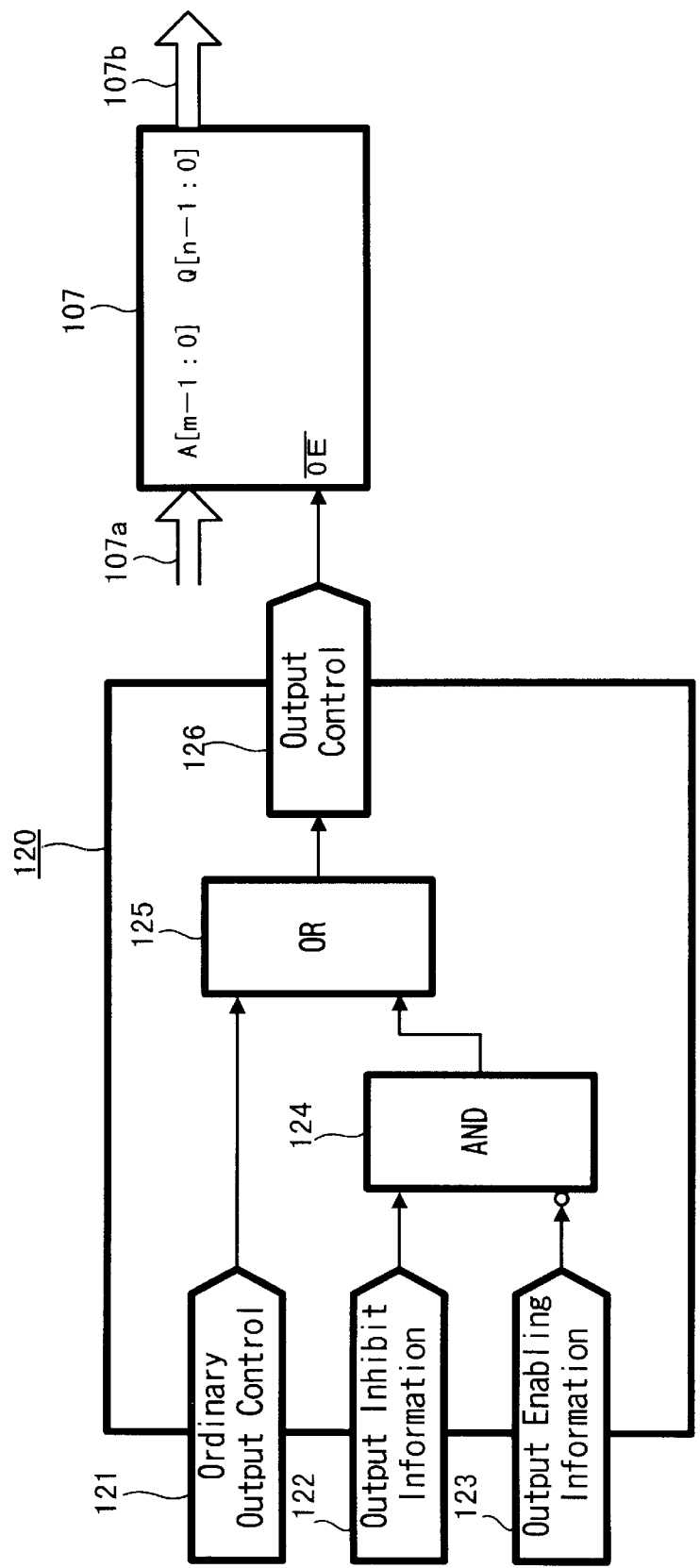
FIG. 3 is a block diagram showing an example of an output control section of a ROM according to the embodiment of the present invention.

As shown in FIG. 3, in the ROM output control circuit 120, output control information is supplied to a terminal 121 from the logic unit 105, output inhibit information is supplied to a terminal 122 from the access detecting circuit 111, and output enabling information is supplied to a terminal 123 from the output enabling information generating circuit 113. Here, examples of respective information will be described more in detail below. That is, the output control information is information for enabling output when the signal logic level is the low level "0" signal and which inhibits output when the signal logic level is the high level "1", signal. The output inhibit information is information for inhibiting output when the signal logic level is the high levels "1" signal. The output enabling information is information for enabling output when the signal logic level is the high level "1" signal. Immediately after the integrated circuit 100 is reset, the output inhibit information and the output enabling information are both held at low level "0" signal. (state in which neither the output inhibit nor the output enabling is executed).

The output inhibit information signal supplied to the terminal 122 and a signal which results from inverting the output enabling information supplied to the terminal 123 are supplied to an AND gate 124, in which they are calculated in a logical product fashion. According to the logical product calculation, the AND circuit 124 outputs a high level "1" signal only when output inhibit is required and a low level "0" signal when output inhibit is not required.

Then, the output control information supplied to the terminal 121 and the output from the AND gate 124 are supplied to an OR gate 125, in which they are calculated in a logical sum fashion. A logical sum output from the OR gate 125 is supplied from a terminal 126 to an output control terminal OE(output enable terminal) of the ROM 107. When the low level "0" signal is supplied to the output control terminal OE of the ROM 107, data stored in an address designated by address data supplied through a bus line 107a is outputted from a bus line 107b. Conversely, when the high level "1" signal is supplied to the output control terminal OE, data stored in that address is inhibited from being outputted from the bus line 107*b* even though address data is supplied.

Since the output control information supplied to the terminal 121 is information which enables output when the logic signal level is the low level "0" signal, under the condition that the low level "0" signal is supplied from the AND gate 124 to the OR gate 125, the output control information of the low level "0" signal is directly supplied to the terminal 126 to the ROM 107 whereby data stored in an address designated by address data supplied through a bus line 107*a* is read out from the ROM 107. Then, when the high level "1" signal indicating the state that output should be inhibited is obtained as the output from the AND gate 124, information supplied from the OR gate 125 to the output control terminal OE becomes the high level "1" signal so that reading of data from the ROM 107 is inhibited.

Even when output inhibit information supplied from the access detecting circuit 111 is the high level "1" signal indicating that the output should be inhibited, if the output enabling signal from the output enabling information generating circuit 113 is the high level "1" signal indicating that the output should be enabled, then output control information which becomes the low level "0" signal for inhibiting output and which is supplied to the terminal 121 is supplied to the ROM 107 as the output of the AND gate 124.

The manner in which data stored in the ROM 107 is outputted under control of the circuit thus arranged will be described with reference to a flowchart of FIG. 4.

Figure 4:
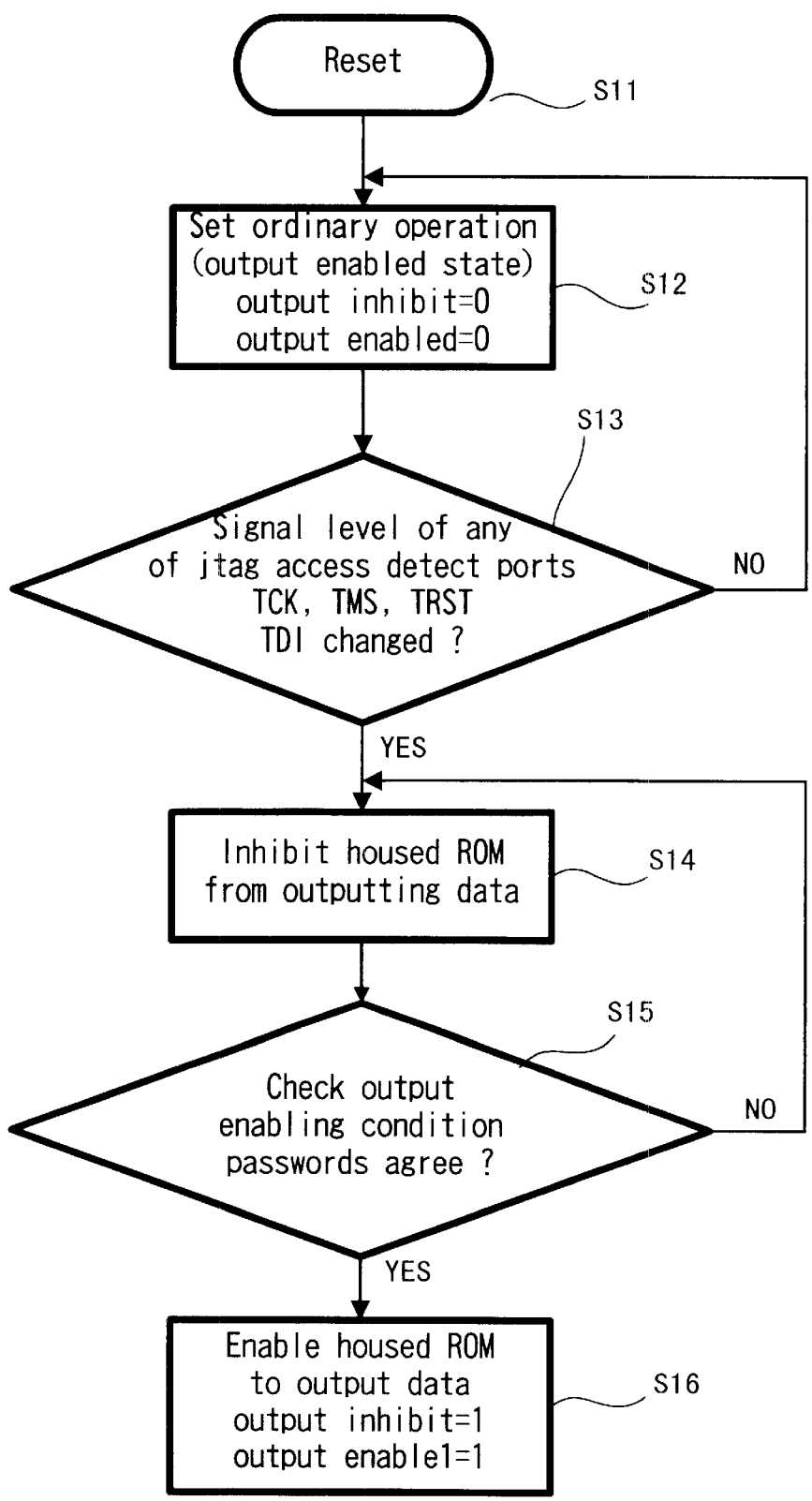
FIG. 4 is a flowchart to which reference will be made in explaining data output processing according to the embodiment of the present invention.

Referring to FIG. 4, when the integrated circuit 100 is initialized and reset at step S11, output enabled state indicating ordinary operation from the ROM is set at step S12. In this output enabled state, the output inhibit information is the low level "0" signal, and the output enabled information also is the low level "0" signal.

In the next decision step S13, it is determined whether or not the access detecting circuit 111 detects the accessing. If the level of the predetermined port (e.g. test clock signal port: TCK) detected by the detecting circuit 111 is not changed as represented by a NO at the decision step S13, then control goes back to the steps S12, S13 and the steps S12, S13 are repeated. If the above-mentioned level is changed as represented by a YES at the decision step S13, then control goes to the next step S14. In the step S14, the output of data stored in the ROM 107 housed within the integrated circuit 100 is inhibited from being outputted. This output inhibit processing will be described more fully below. That is, the output inhibit information supplied from the access detecting circuit 111 is changed to the high level "1" signal and the information supplied to the output control terminal OE of the ROM 107 becomes the high level "1" signal, thereby inhibiting data from being read out from the ROM 107.

Under the state that this output inhibit processing is executed, it is determined at the next decision step S15 by the output enabling information generating circuit 113 whether or not the output enabling condition is satisfied, e.g. passwords agree with each other. If the output enabling condition is satisfied as represented by a YES at the decision step S15, then control goes to the next step S16, whereat the output enabling information supplied from the output enabling information generating circuit 113 to the output control circuit 120 goes to the high level "1" signal and the information supplied to the output control terminal OE of the ROM 107 goes to the low level "0" signal, thereby enabling data to be read out from the ROM 107. Incidentally, in order to recover the original condition under the state that the reading of data is enabled at the step S16 it might be necessary to reset the integrated circuit.

According to the above-mentioned processing, when the JTAG protocol control signal is supplied to the integrated circuit 100 of this embodiment from the outside through the access port 101, the microprocessor 103 becomes able to access the outside, whereby operations of respective units within this integrated circuit 100 can be controlled from the outside. In this embodiment, when it is detected that the level of any port (e.g. test clock signal port: TCK) of the access port 101 is detected, the ROM output control circuit 120 inhibits data from being read out from the housed ROM 107 so that data cannot be read out from the ROM 107 to the side of equipment connected to the I/O port 108, for example. Accordingly, by supplying the JTAG protocol control signal from the outside, data can be inhibited from being read out from the ROM 107, thereby making it possible to maintain a secrecy of data stored in the ROM 107.

On the other hand, if the reading of data from the ROM 107 is constantly controlled by supplying the JTAG protocol control signal, then there occurs a trouble in debugging using data stored in the ROM 107, for example. In this embodiment, by inputting a specific password or the like into the read control port 112, for example, from the outside in such a manner that the output enabling information generating circuit 113 becomes able to generate output enabling information, the read inhibit processing executed by the ROM output control circuit 120 is released so that it becomes possible to read out all data from the ROM 107 by the JTAG protocol control signal. Thus, it becomes possible to execute debugging. With the password or the like for releasing the ROM output control circuit 120 from the output inhibit processing, then a secrecy of data stored in the ROM 107 and an improvement of throughput in the debugging can be made compatible with each other.

Incidentally, the arrangement in which the output is enabled by the output enabling information from the output enabling information generating circuit when the JTAG port is accessed may be omitted, and it is possible to use an arrangement in which the output inhibit processing for inhibiting the memory from outputting data when the JTAG port is accessed cannot be released. Moreover, as the arrangement for releasing the output inhibit processing using this output enabling information generating circuit 113, the output enabling information generating circuit 113 may be modified such that the output enabling information generating circuit 113 generates output enabling information in response to control data supplied thereto from the circuit, such as the microprocessor 103, of the integrated circuit 100.

While the access made by the JTAG protocol control signal is detected based on the change of level of the test clock signal port TCK as described above, the above-mentioned access may be detected based on the change of the level of other JTAG ports. That is, so long as the port changes its level when it is accessed by the JTAG protocol control signal, the access may be detected from any port state. For example, the access may be detected based on the change of level of the test mode select signal port TMS, the test reset signal port TRST and the test data input signal port TDI. Further, the access may be detected more reliably by detecting the changes of levels of a plurality of ports in the above-mentioned ports. Furthermore, while the present invention is applied to the integrated circuit that can be accessed from the outside by the JTAG protocol control signal, the present invention is not limited thereto, and the following variant is also possible. That is, in an integrated circuit that can be accessed from the outside by protocol standardized according to other standards, the present invention is applied to the case in which reading of data from a housed memory is limited when the access is made by such protocol. The circuit for limiting reading of stored data also may be modified as an arrangement for limiting reading of data from other memory than the above illustrated ROM.

While reading of all data from the housed memory is inhibited when the access is made by a protocol such as the JTAG protocol as described above, the present invention is not limited thereto, and only reading of data stored in a part of address within memory data such as memory may be limited.

Figure 5:
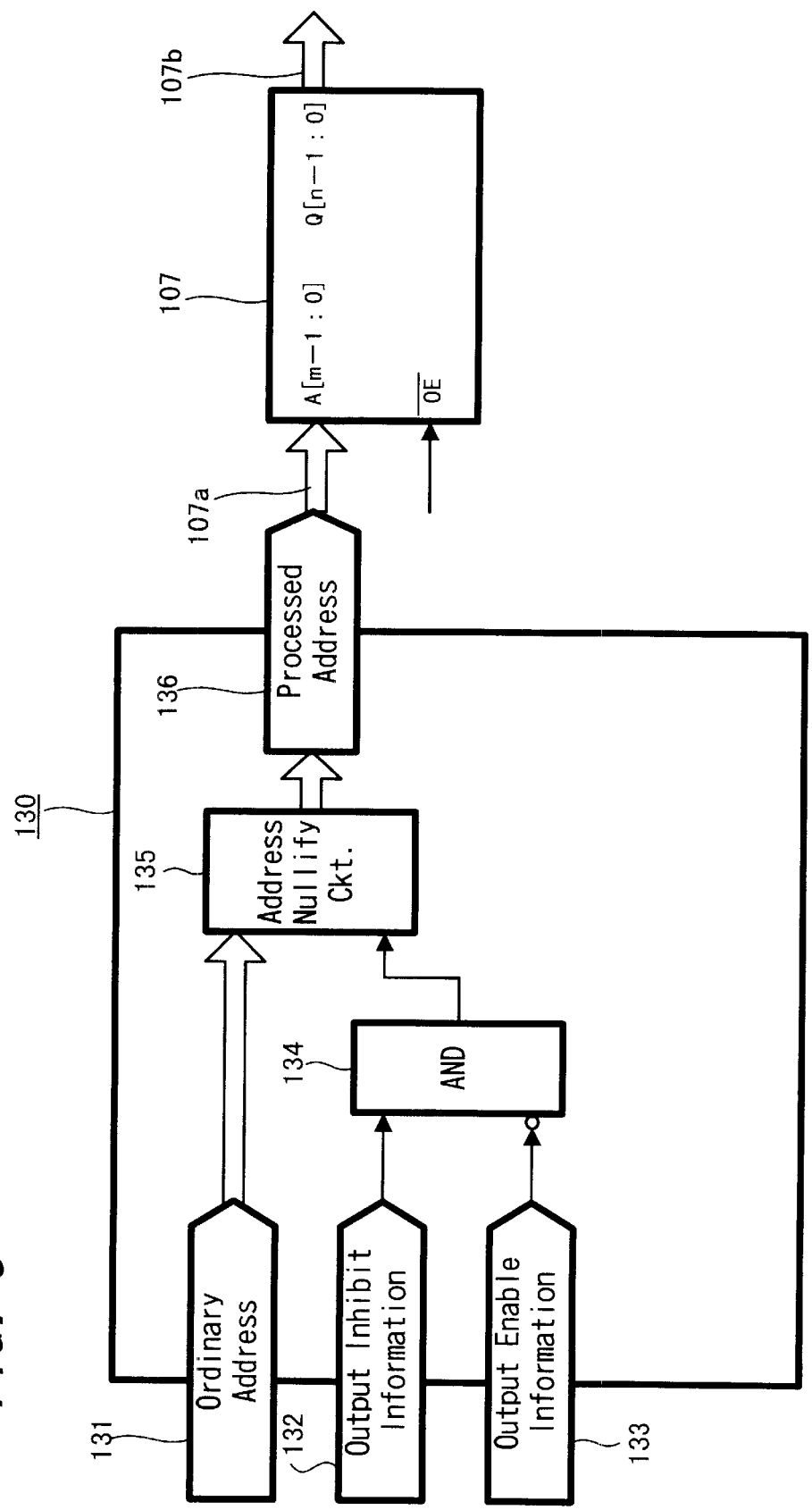
FIG. 5 is a block diagram showing an example of an output control section of a ROM according to another embodiment of the present invention.

While the output inhibit processing is executed by controlling the data supplied to the output enable terminal of the ROM 107 with the output control circuit 120 as described above, the present invention is not limited thereto, and the output inhibit processing of memory data of memory such as a ROM may be executed by other arrangement. For example, read address data supplied to a memory may be nullified when output is inhibited. FIG. 5 is a block diagram showing an example of an arrangement used in such case. As shown in FIG. 5, in a ROM output control circuit 130, address data is supplied to a terminal from the logic unit 105 shown in FIG. 2, output inhibit information is supplied to a terminal 132 from the access detecting circuit 111 shown in FIG. 2, and output enabling information is supplied to a terminal 133 from the output enabling information generating circuit 113 shown in FIG. 2. In this case, the address data is data instructing an address from which data stored in the ROM 107 is read out. In this case, as output inhibit information is obtained at the terminal 132, there is used data which goes to high level "1" signal when output is inhibited. As output enabling information is obtained at the terminal 133, there is used data which goes to high level "1" signal when output is enabled.

Then, the signal of the output inhibit information obtained at the terminal 132 and a signal which results from inverting the output enabling information obtained at the terminal 133 are supplied to an AND gate 134, in which they are calculated in a logical product fashion. A resultant logical product output of the AND gate 134 is supplied to an address nullify circuit 135. The address nullify circuit 135 is a circuit for controlling the address data obtained at the terminal 131 based on the output from the AND gate 134. When the low level "0", signal is supplied from the AND gate 134, for example, the address nullify circuit 134 directly supplies address data to an output terminal 136. When on the other hand the high level "1" signal is supplied from the AND gate 134, the address nullify circuit 135 nullifies address data (e.g. nullifies address data to provide meaningless data such as 0 address). Then, the address nullify circuit 135 supplies address data obtained at the output terminal 136 to the read address input terminal of the ROM 107. Incidentally, control data is directly supplied to an output enable terminal of the ROM 107 from the logic unit 105 shown in FIG. 2.

Since the integrated circuit is arranged as described above, the supply of address data to the ROM is limited so that, when an access is made from the outside by protocol standardization such as JTAG protocol, reading of data stored in the ROM is restricted, thereby making it possible to maintain a secrecy of stored data similarly to the case of the arrangement described in the above-mentioned embodiment.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An integrated circuit, comprising:

a memory for storing data;

control means for controlling reading of said data stored in said memory from a terminal;

an access port for receiving control data and supplying said control data to said control means;

access detecting means for detecting whether said control data are received at said access port by detecting a change in a level of a signal applied to said access port;

output inhibit means for inhibiting reading of said data stored in said memory from said terminal when said access detecting means detects that said control data are received at said access port;

a read control port; and output inhibit releasing means for releasing output inhibit processing executed by said output inhibit means by detecting a specific password at said read control port, so that said data stored in said memory are read out from said terminal.

2. An integrated circuit as claimed in claim 1, wherein said access detecting means comprises means for detecting a change of level of at least one of a test clock signal, a test mode select signal, a test reset signal and a test data input signal received at said access port.

3. An integrated circuit according to claim 1, wherein said output inhibit releasing means releases said output inhibit processing executed by said output inhibit means by writing specific data to said output inhibit means.

* * * * *